United States Patent [19]
Sperling et al.

[11] 4,455,724
[45] Jun. 26, 1984

[54] CASTING MACHINE FOR GRIDS OF LEAD STORAGE BATTERIES

[75] Inventors: Friedrich Sperling, Gutenberg; Aloys Hennecke, Brilon, both of Fed. Rep. of Germany

[73] Assignee: Accumulatorenwerk Hoppecke Carl Zoellner & Sohn GmbH & Co. KG, Cologne, Fed. Rep. of Germany

[21] Appl. No.: 255,617

[22] Filed: Apr. 20, 1981

[30] Foreign Application Priority Data

Apr. 24, 1980 [DE] Fed. Rep. of Germany ....... 3015726

[51] Int. Cl.³ .................. B26D 19/10; B65G 29/00; B65G 37/00
[52] U.S. Cl. ......................................... 29/2; 198/477; 198/485
[58] Field of Search ................. 29/2; 198/477, 485

[56] References Cited

U.S. PATENT DOCUMENTS

| | | | |
|---|---|---|---|
| 1,795,612 | 3/1931 | Lormor | 29/2 |
| 2,318,438 | 5/1943 | Voth | 29/2 |
| 2,654,939 | 10/1963 | Donath | 29/2 |
| 3,051,030 | 8/1962 | Winkel | 29/2 |
| 3,486,942 | 12/1969 | Hatterschide | 29/2 |
| 3,741,365 | 6/1973 | McAlpine | 198/477 |
| 4,134,318 | 1/1979 | Rader et al. | 29/2 |
| 4,160,309 | 7/1979 | Scholle | 29/2 |
| 4,199,849 | 4/1980 | Moreau | 29/2 |

Primary Examiner—E. R. Kazenske
Assistant Examiner—Paul M. Heyrana
Attorney, Agent, or Firm—Martin A. Farber

[57] ABSTRACT

A machine for the casting and subsequent stamping of grids for lead storage batteries, particularly ones consisting of low-Sb and Pb-Ca alloys, has a pouring nozzle to receive and pour a predetermined amount of melt into a casting mold arranged vertically beneath it. For removal from the mold, conveyance and machining of the castings without deformation, particularly if soft alloys are used a lifter for the casting is arranged on the casting mold, by means of which lifter the casting can be brought while remaining in its vertical position onto a conveyor device which is developed as a cooling path for hardening of the casting. At the end of the path a deflection unit repositions the casting which has been transported vertically up to this point into a horizontal position and by a feed device is advanced to a stamping machine from where the grid passes onto a conveyor belt.

21 Claims, 6 Drawing Figures

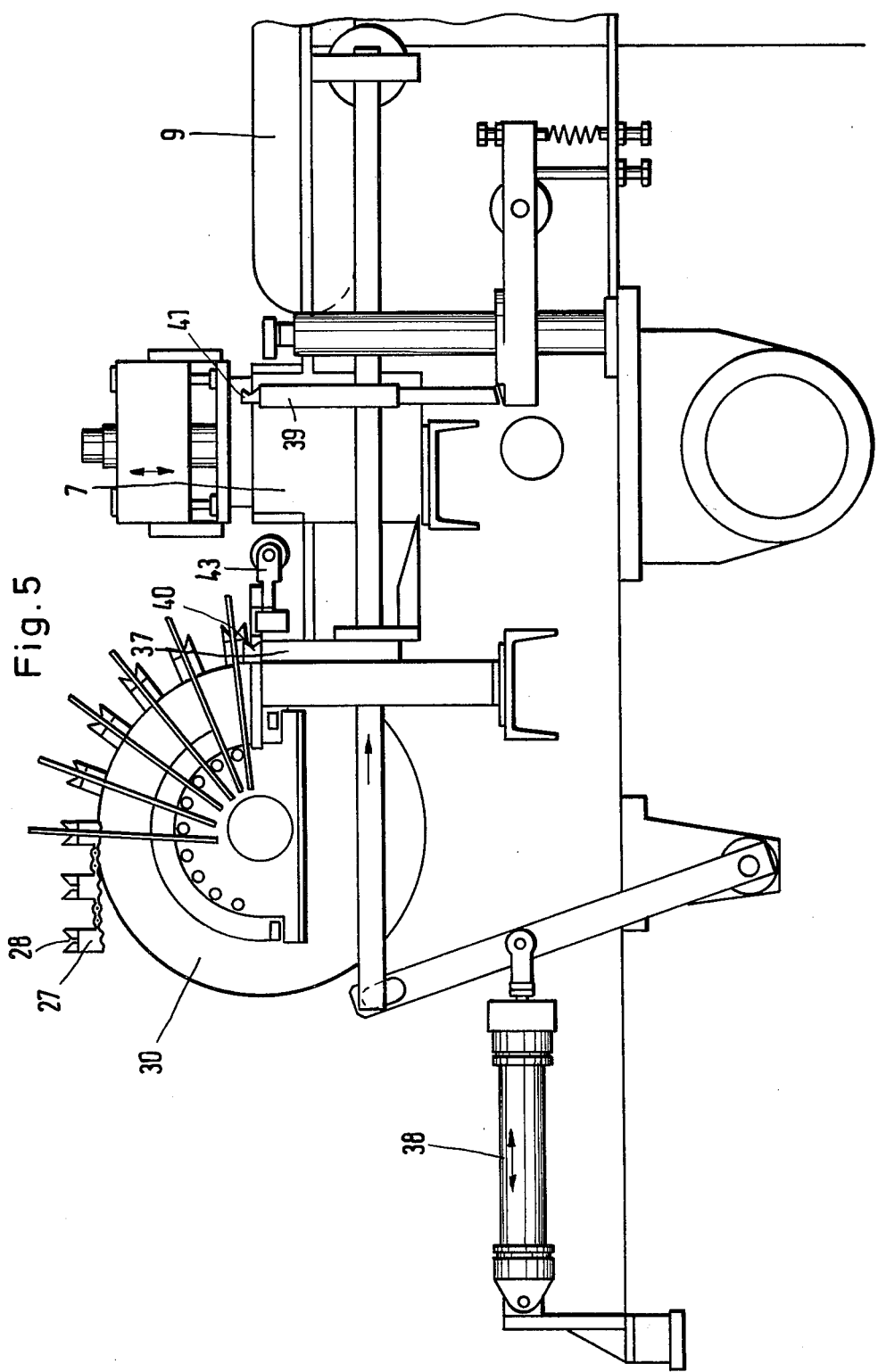

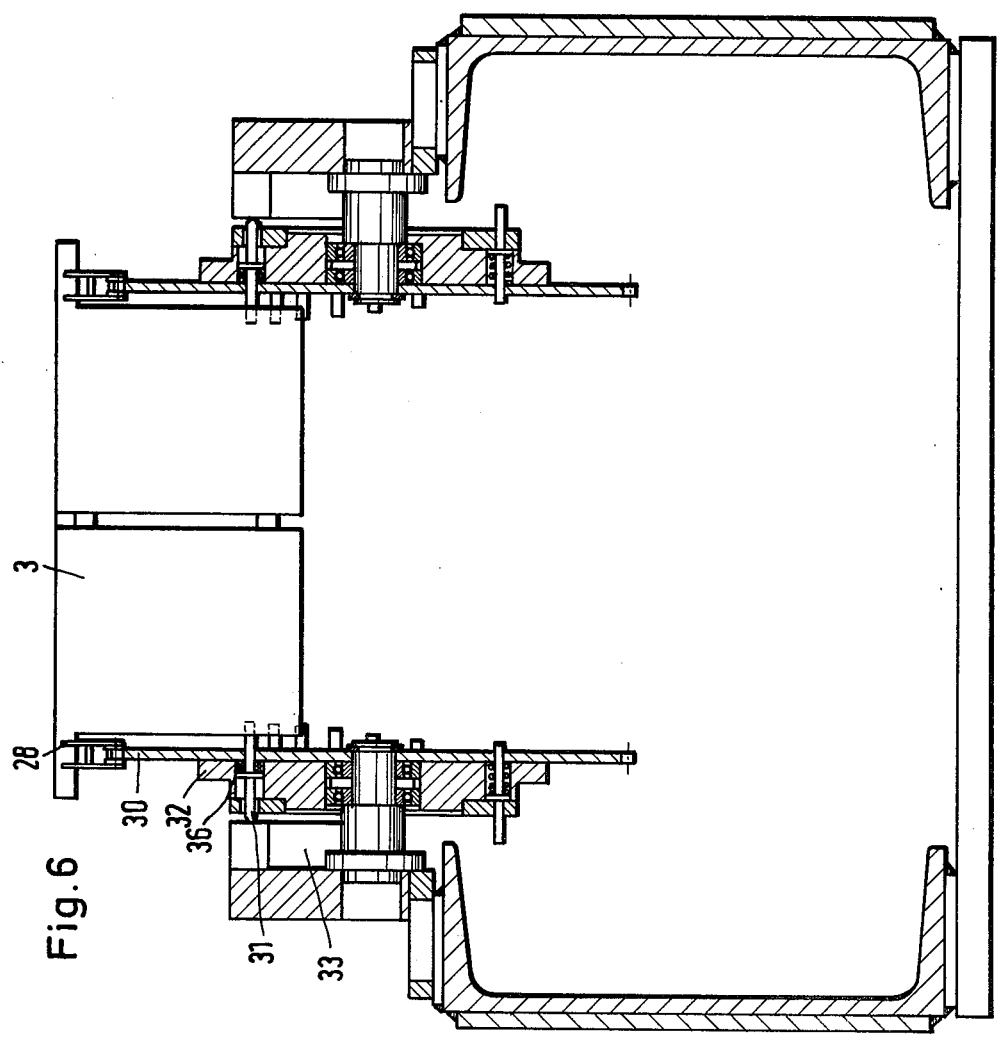

CASTING MACHINE FOR GRIDS OF LEAD STORAGE BATTERIES

The present invention relates to a machine for the casting and subsequent stamping of grids for lead storage batteries, in particular made of low-Sb and Pb-Ca alloys, having a pouring nozzle to receive and pour a predetermined amount of melt into a casting mold which is arranged vertically beneath it.

It is already known to cast grids for lead storage batteries via a pouring nozzle into a vertically arranged casting mold and to eject the casting from the opened mold by an ejector over a chute of sheet metal onto a conveyor belt arranged horizontally below the casting mold. The conveyor belt takes over the further transportation to a stamping device. The deflection of the castings which have just been cast and still not hardened via the chute onto the conveyor belt causes a deformation of the grids which in extreme cases can lead to complete 360° bends of the material. Accordingly, the resultant rejects which must be melted down again constitute a disadvantage. In addition there is the disadvantage that prior to the stamping an additional machining process must be carried out by a roller device, which again means mechanical stressing. Finally, there is the disadvantage that the feeding of the castings to the stamping machine takes place over an inclined plane since the stamping machine is arranged obliquely. The grid feed formed on the bottom of the casting strike against an abutment for positioning below the stamping unit, whereby deformations can occur.

The object of the present invention is to effect removal from the mold, conveyance and machining of the castings without the danger of deforming the grid in particular even if soft alloys such as, for instance, low-Sb alloys and Pb-Ca alloys are used.

This object is achieved in accordance with the invention by the provision on the casting mold of a lifter for the casting by which it can be brought, while remaining in its vertical position, onto a conveyor device which is developed as cooling path for the hardening of the casting at the end of which a deflection device is arranged for the delivery in horizontal position of the casting which until then has been transported vertically to a stamping machine by means of a feed device, the grid passing onto a conveyor belt from the stamping machine. In this way the result is obtained that due to the fact that the casting remains in the vertical position during removal from the mold no deformation can occur, whereby due to the development of the transportation device as a cooling path and the creation of a deflection station at the end of the cooling path, it is possible safely to bring the casting without deformation into a horizontal position in which it remains until introduction into the stamping machine due to the presence of a feed unit. The entire process of casting, hardening and stamping of the soft, deformation-sensitive Pb grid takes place free of any substantial mechanical stresses so that the afore-mentioned disadvantages of the known removal from the mold and further processing are avoided.

On the machine frame, below the pouring nozzle, there is preferably arranged a bipartite casting mold having one part arranged fixed on a casting-mold mount and a movable part which can be moved away from said first part in a horizontal direction, within which, on both sides of the grid and in the region of the grasping of the grid lugs, there are provided vertical recesses for a double-armed lifter by which the grid lugs can be grasped and lowered after the opening of the casting mold. The two arms of the lifter can advantageously be formed as bell-crank levers which are pivoted eccentrically to the machine frame and can be swung outwardly by a hydraulic or pneumatic displacement cylinder. For actuation the bell-crank levers can be connected with each other by an articulated connecting bar on which the cylinder acts vertically. For the better grasping of the grid lugs the lift arms are provided with a slot guide. An axially movable ejector which passes through the casting mold facilitates the loosening of the casting from the mold and the taking over thereof by the lifter, which previously, when the mold was closed, was lifted into its receiving position. By means of a tension spring, the of the lifter arms are restored after the casting has been placed on the conveyor device.

The conveyor device, which is developed as a cooling path, preferably comprises two driven endless chains arranged below the casting mold at a distance apart from each other equal approximately to the distance between the grid lugs and, removers for grasping the grid lugs of the casting which has remained vertical being fastened to the chains. The two endless chains are mounted with the distance between each other adjustable for adaptation to different size grids. The receivers are suitably formed as straps with a keyseat or tapered seat guide, fastened on each second chain link so that a reliable reception of the casting is assured.

In order to intensify the cooling effect and assure stress-free cooling and hardening of the casting on all sides, it is proposed, in one suitable embodiment of the invention, that the chains be surrounded by a lateral sheet-metal covering in such a way as to form a cooling tunnel to which a cooling fluid, for instance air or water, can be fed and uniformly distributed in a simple manner. Stress-free uniform cooling is possible due to the free suspension of the castings, spaced apart from each other, in the cooling channel.

One particularly advantageous formation of the deflection unit is obtained in one suitable embodiment of the invention in combination with the above-described cooling path by providing on the sprocket wheels (which sprocket wheels are located at the end of the cooling path) at about half the radius inwardly projecting pins which are axially controlled movably, each two opposite pins grasping one casting at its lower end and guiding it, in the deflection movement of the chains, into the horizontal position as a four-point support. The control of the axial movement of the pins can be effected via in each case one stationary cam on each sprocket wheel, the pins being mounted against springs which bias them into their return position. In this way a controlled course of the deflection of the castings from the perpendicular into the horizontal position is assured in a simple manner.

Depositing of the castings is effected, in accordance with the proposed embodiment of the invention, onto a plate which is arranged between the sprocket wheels, and on each of the two sides of which a driver is displaceably arranged, the drivers grasping the grid lugs. The drivers are provided with a key-seat or tapered slot guide and are preferably moved forwardly and backwardly by a piston/cylinder unit, the path of movement being so dimensioned that a horizontal displacement of each casting into the stamping position is effected. For simultaneously transporting away of the grid which has been previously completely worked in the stamping machine onto the following conveyor belt it is advantageous to provide another pair of drivers arranged at a distance from the first-mentioned pair of drivers so that the stamping machine is simultaneously loaded and unloaded. Support rolls can be arranged in this connection between the deposit plate and the stamping machine.

The control of the opening of the mold, the raising and lowering movement of the lifter as well as the speed of the movement of travel of the conveyor chains are adjusted to each other and are advantageously variable in order to permit different cycle times as a function of the size of the grids to be produced and their alloy. Of course, the operating cycle of the feed device and of the stamping machine is adjusted hereto, it being proposed in particular to arrange within a recess of the deposit plate a proximity switch which controls the feed device and the casting and stamping cycle.

Further details, features and advantages of the casting and stamping machine of the invention will be evident from the following description of the accompanying drawings in which a preferred embodiment of the invention has been diagrammatically shown. In the drawing:

FIG. 5 shows the end of the cooling path and the stamping machine in a side view, and FIG. 6 shows the deflection unit in a front view.

Figure 1:
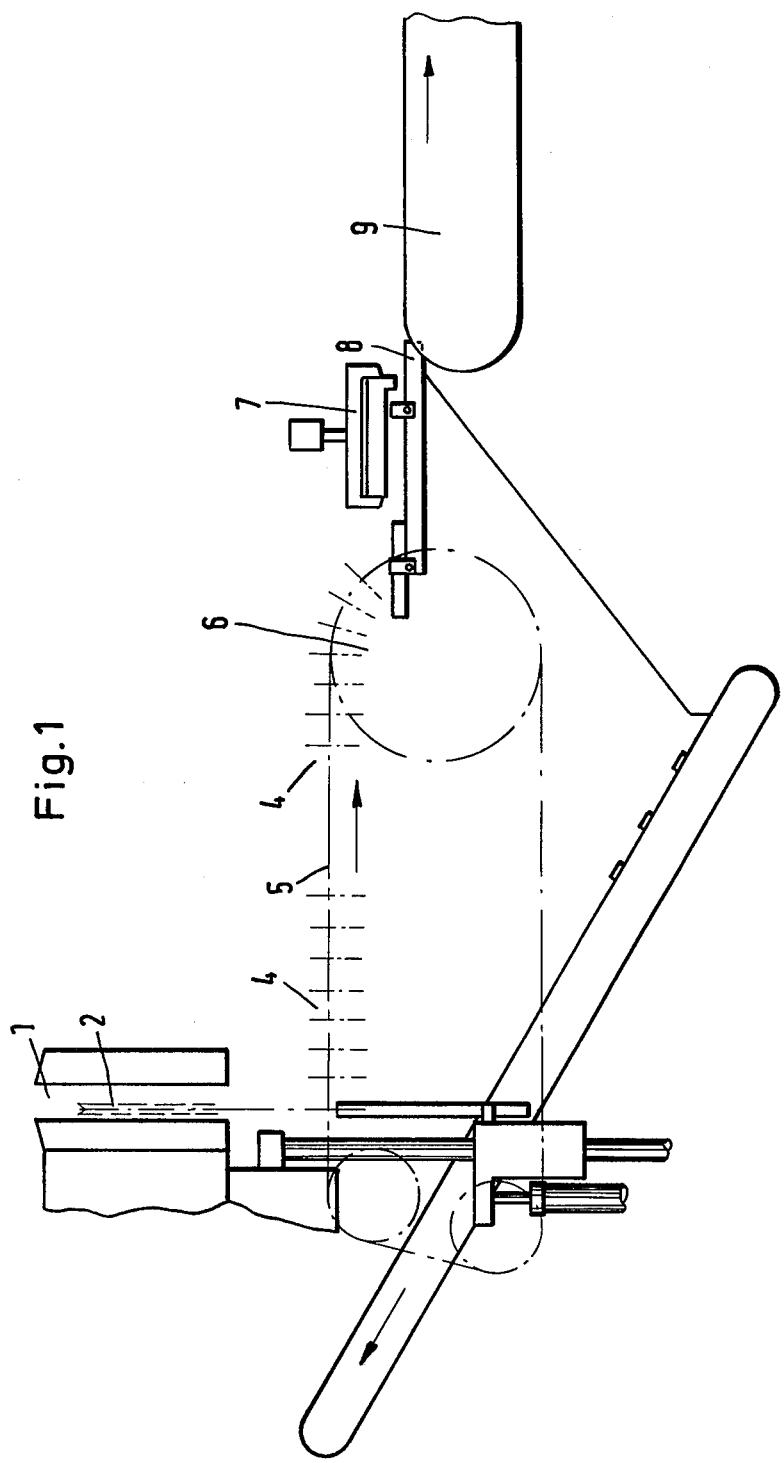
FIG. 1 is a diagrammatic view of a casting and stamping machine for grids of lead storage batteries.

The machine for casting and subsequent stamping of soft grids for lead storage batteries consisting of a low-Sb alloy which is shown in the drawing comprises essentially a casting mold 1, a lifter 2 cooperating with same for the casting 3, a transport device 5 for the castings which is developed as a cooling path 4, a deflection unit 6 which is arranged at the end of the cooling path 4, and a stamping machine 7 which is loaded and unloaded by a feed device 8, the unloading taking place onto a conveyor belt 9.

Figure 2:
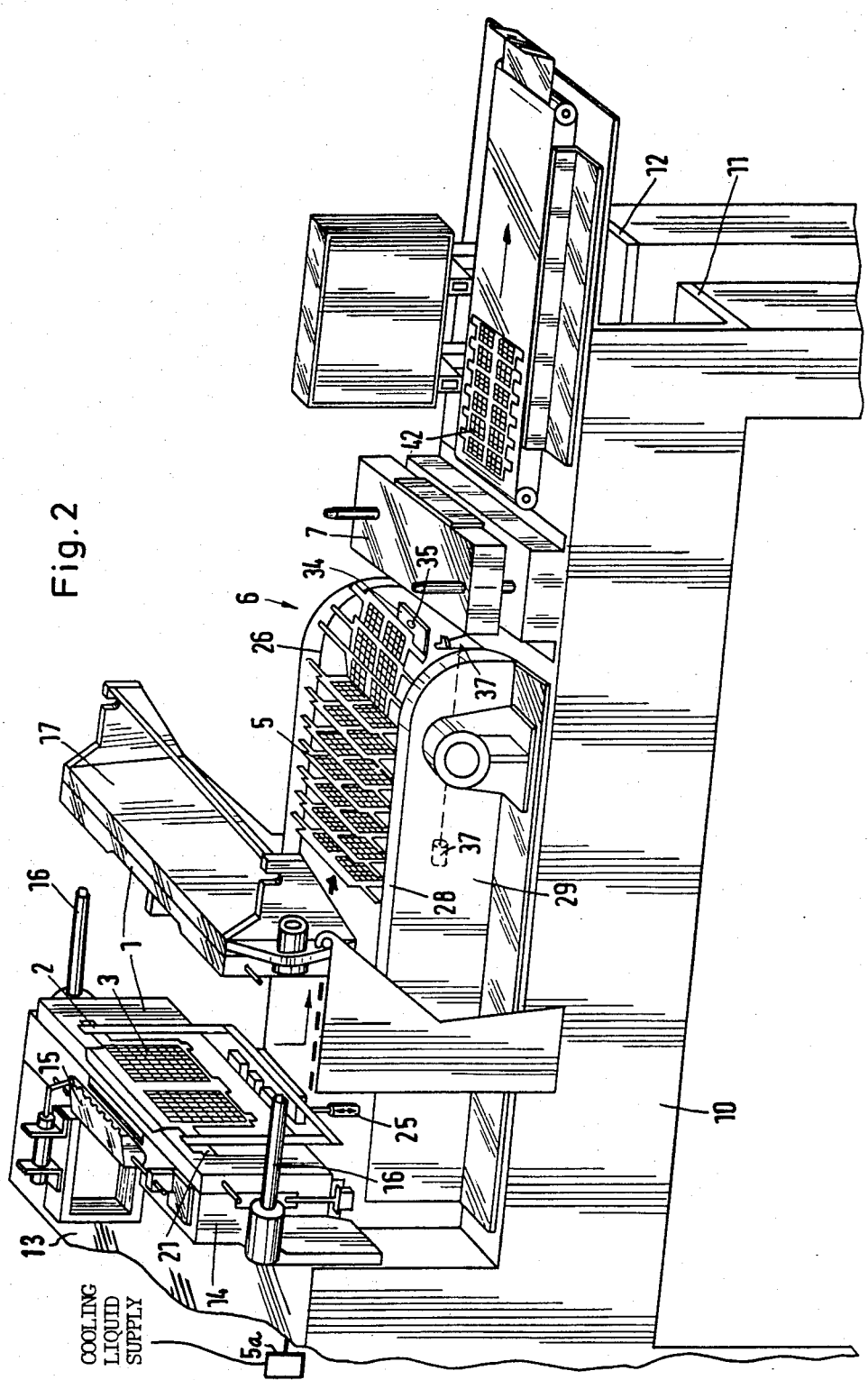
FIG. 2 shows the machine of FIG. 1 in perspective.

A more precise structural formation of the casting and stamping machine can be noted from the perspective view thereof contained in FIG. 2. In accordance therewith, the machine comprises of a machine frame 10 formed of two elongated supports 11, 12 arranged parallel to and spaced from each other, standing on four feet and being connected crosswise to each other at their end by a casting-mold holder 13. On the front of the casting-mold holder 13 there is fastened a mold receiver 14 which bears at the top a pouring nozzle 15 to receive and pour a predetermined quantity of melt.

Below the pouring nozzle 15 there is located the casting mold 1 which comprises a part which is firmly fastened to the casting mold receiver and a part 17 which is movable on guides 16. This is indicated diagramatically in FIG. 2 of the drawing whereby the casting 3 which is still present in the casting mold 1 is made visible.

Figure 3:
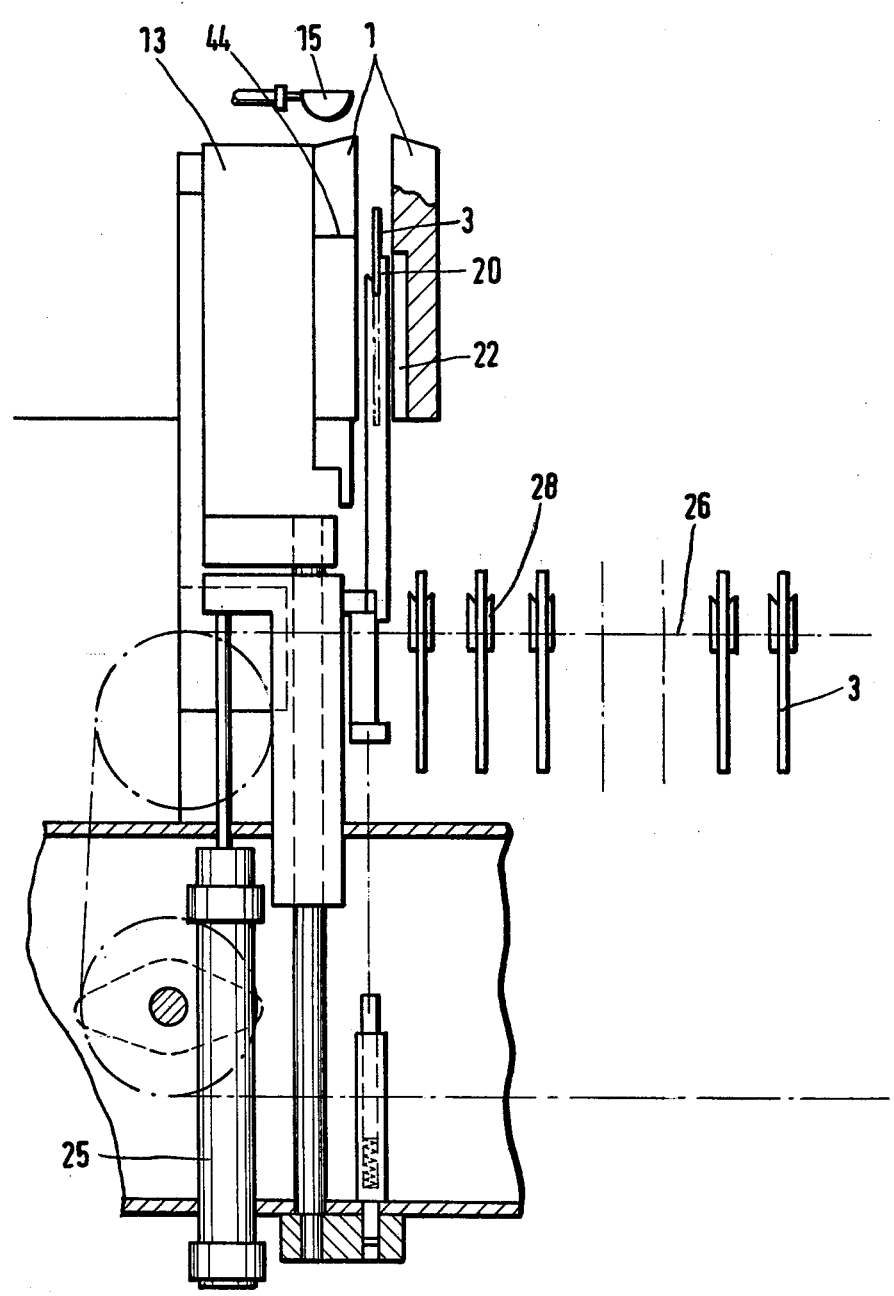
FIG. 3 shows the casting mold and the start of the cooling path in a diagrammatic side view.

The lifter 2 is shown in raised position in FIG. 2 of the drawing, so that its two arms 18, 19 by their guide slot 20 grip the grid lugs 21 of the casting 3. In order to make this possible two corresponding vertical recesses 22 are formed in the movable part 17 of the casting mold 1, which recesses, when the mold is closed, permit the raising of the lifter 2 into the position shown in FIGS. 2 and 3; ejector pins 44, which are movable from the rear against the casting 3, facilitate the removal and the loosening from the casting mold. The two arms 18, 19 are formed as bell crank levers which are pivoted eccentrically to the machine frame (see FIG. 4 of the drawing) and are pivotally connected joint bar of with each other by a connecting strap 23. After the completion of the depositing of the casting 3 on the transport device 5 the connecting bar 23 presses against a lower stop so that a lateral spreading apart of the two lift arms is effected and the casting is thus released. Two tension springs 24 bring the two arms back into their starting position upon the upward travel. The lifting and lowering movement of the lifter 2 is effected by a displacement cylinder 25.

The transport device 5, which comprises of two driven endless chains 26 arranged spaced apart from each other, is arranged below the casting mold 1 on the two supports 11, 12 of the machine frame 10. The distance between the two chains is such that receivers 27 fastened on them grip the grid lugs 21 approximately centrally, so that each casting 2 hangs freely in the vertical position between the chains. The receivers 27 are formed as straps fastened on each second chain link (see FIG. 5 of the drawing), the straps sitting in the manner of riders on the chain and having at their top a tapered slot or key seat guide 28 for the reliable reception of the grid lugs 21.

Figure 4:
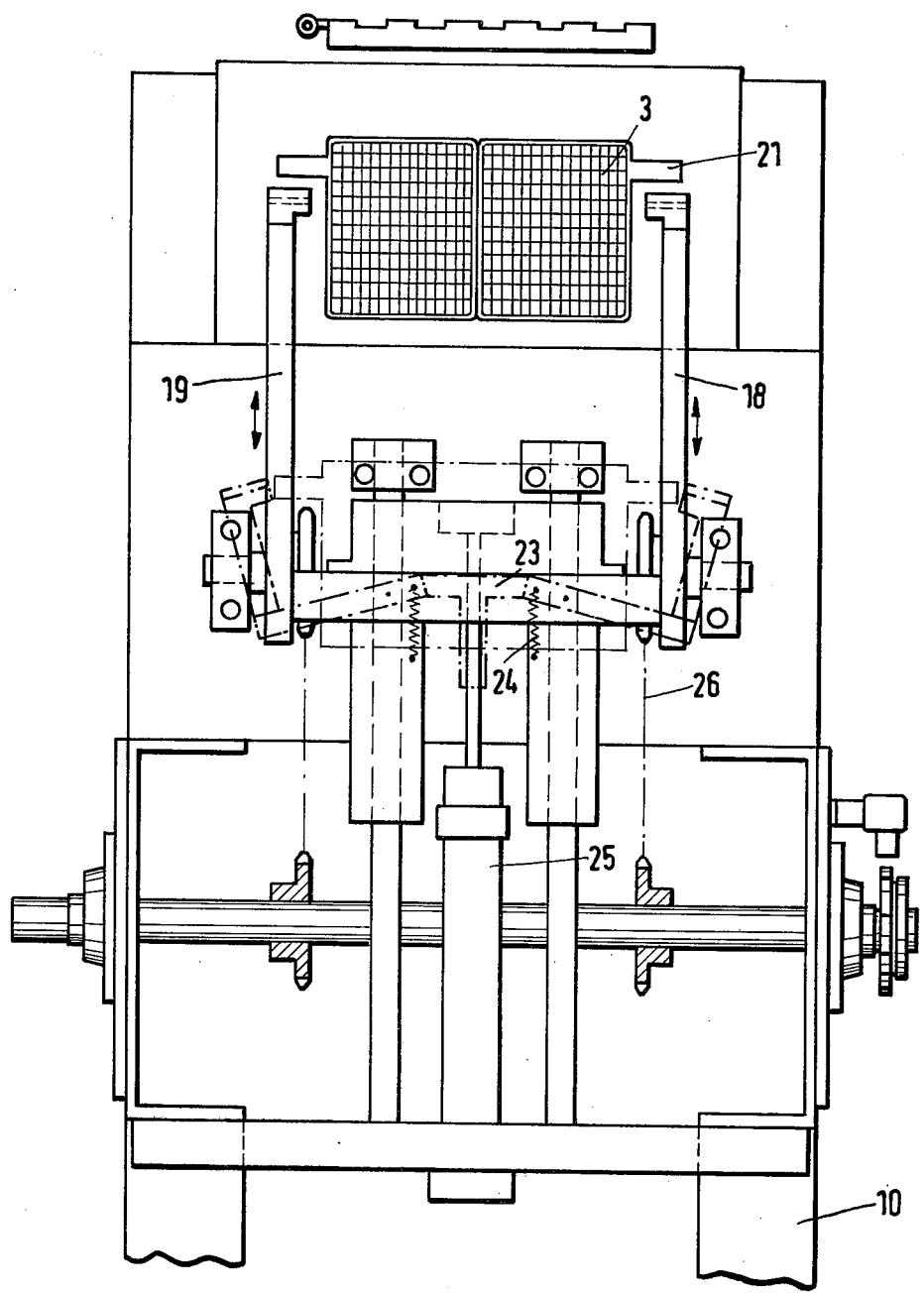
FIG. 4 shows the casting mold with the lifter in front view.

The lifting and lowering movement of the lifter 2 as well as the swinging of its arms towards the outside is not prevented by the transport device 5 since the upper course of the chains 26 is surrounded on the outside by the angle arm levers. FIG. 4 of the drawing shows the possibility of free movement of these two parts of the casting machine.

The castings 3, which are placed one behind the other on the transport device 5 in the manner described, move slowly with the rotation of the chains 26 in the direction towards the deflection unit 6 and are thereby intensively cooled free of stress on all sides. For this purpose, cover plates 29 are fastened laterally to the supports 11, 12, outside the two chains 26 over the entire length of the cooling path, forming a cooling tunnel (channel) to which a cooling fluid can be fed in simple fashion by means of a cooling fluid supply 5a. The hardening of the castings 3 is complete before they reach the deflection unit 6.

The castings must be brought from the vertical position of transport into a horizontal position in order to permit a deformation-free feed to the stamping machine 7. For this purpose bales are formed in the two sprocket wheels 30 present at the end of the cooling path—as can be noted from FIGS. 5 and 6 of the drawing—at the mid radius, through which holes there extend pins 31 which are mounted under spring biasing and displaceable axially inwardly in a support 32 arranged in the outside of the sprocket wheels 30. The pins 31 also extend outwardly from the support 32 so that they are present within the region of movement of a cam 33, the curve of which controls the projection of the pins 31 towards the inside. The cam 33 is mounted in each case on the shaft of the corresponding sprocket wheel. By its formation and arrangement, assurance is had that the casting 3, which is in the deflection axis, is supported close to its lower end by a pair of maximum inwardly projecting pins so that together with the moving chains 26 there is obtained a four-point support of the casting 3 and the deflection into the horizontal position takes place.

The casting 3 is deposited on a deposit plate 34 which is provided with a proximity switch 35 which controls the casting and stamping cycle as well as the feed device 8.

In the deposit position, the cam discs 33 permit the springs 36 to press the pins 31 back into their starting position. The feed device 8, which is now activated by the proximity switch 35, at the same time takes over the loading and unloading of the stamping machine 7. The feed device 8 comprises of pairs of drivers 37 and 39 arranged on both sides of the casting 3 in the direction of movement and driven by a piston and cylinder unit 38, the key guides 40, 41 of which driver pairs grip the grid lugs 21 of the oncoming casting 3 and of the grid 42 which is to be pushed out of the stamping machine 7 onto the conveyor belt 9. When the piston rod is in its extended position, the deflected casting is thus transported horizontally into the stamping machine 7 by the drivers 37 arranged on both sides. At the same time, the grid 42 which has already been stamped is pushed by the drivers 39 out of the stamping machine onto the conveyor belt. Between the deposit plate 34 and the stamping machine 7 there are provided support rollers 43.

The control of the opening of the casting mold 1, and of the lifting and lowering movement of the lifter 2, and the speed of the movement of travel of the conveyor chains 26 are adjusted to each other and adjustable in order to permit different cycle times as a function of the size of the grids to be produced and their alloy. The distance between the endless chains 26 is also adjustable.

The operating cycle of the feed device 8 and of the stamping machine 7 is furthermore so adapted that a continuous, disturbance-free manner of operation of the machine is assured.

We claim:

1. In a machine for the casting and subsequent stamping of grids for lead storage batteries, particularly of low-Sb and Pb-Ca alloys, having a pouring nozzle to receive and pour a predetermined quantity of melt into a vertically arranged casting mold below it, the improvement comprising
    a transport means,
    means operatively arranged on the casting mold comprising a lifter means for engaging a respective casting produced in the casting mold and for delivering the casting onto said transport means while keeping the casting in a vertical position, respectively,
    said transport means being formed as a channel constituting a cooling path for hardening the castings,
    means for passing a cooling fluid into said channel,
    said transport means for transporting the castings in the vertical position thereof,
    a deflection means arranged at an end of the cooling path for repositioning a respective one of the castings into a horizontal position, respectively,
    a stamping means for stamping the casting, respectively,
    a feed means for feeding said casting from the deflection means in the horizontal position to said stamping means, respectively,
    a conveyor belt means for receiving the stamped said casting from said stamping means, the stamped casting constituting one of said grids,
    said casting mold constitutes means for producing the respective casting with lugs on the upper lateral sides thereof,
    said transport means comprises two driven endless chains arranged beneath said casting mold at a distance spaced apart from each other equal to approximately the distance between said lugs of the casting,
    receiver means are fastened on said chains for gripping the lugs of the casting holding the latter in the vertical position,
    coaxially arranged sprocket wheels engaging said chains located at an end of said cooling path,
    said deflection means includes axially controlled moveable pins mounted on each of said sprocket wheels approximately at a mid-radius and projecting inwardly therefrom forming pairs of said pins, each of said pairs of pins engaging said respective one of said castings at a lower end of said respective one of said castings and guiding said respective one of said castings in a deflection movement of said chains into the horizontal position as a four-point support together with said receiver means on said chains, respectively, and
    means for moving a selected pair of said pins for said engaging of said respective one of said castings, respectively.

2. The machine according to claim 1, further comprising
    a machine frame,
    a casting mold holder connected to said machine frame,
    said casting mold comprises a two part casting mold disposed on said machine frame below said pouring nozzle,
    said two part casting mold has a fixed part fixedly mounted to said casting mold holder and a movable part moveably mounted for movement in a horizontal direction toward and away from said fixed part for closing and opening, respectively, said casting mold,
    said moveable part of said casting mold is formed with vertically extending recesses on both sides of the casting in a region adapted for grasping of the lugs formed on the casting by said lifter means,
    said lifter means has two arms displaceably disposed in said vertical recesses, respectively, for grasping the lugs of the casting and for lowering the casting onto said transport means after opening of the casting mold.

3. The machine according to claim 2, wherein said two arms arms are formed as bellcrank levers which are pivoted eccentrically to said machine frame, and
    means for swinging said levers outwardly apart when said lifter means lowers the casting into the transport means.

4. The machine according to claim 3, wherein said swinging means is a hydraulic displacement cylinder.

5. The machine according to claim 3, wherein said swinging means is a pneumatic cylinder.

6. The machine according to claim 3, wherein said swinging means comprises a counterholder for causing the swinging out of said levers.

7. The machine according to claim 2, wherein said two arms are each formed with a slot guide means for receiving therein the lugs of the casting.

8. The machine according fo claim 2, further comprising
   means for moving said two arms apart so as to release the casting when said lifter means lowers the casting onto the transport means,
   tension spring means for restoring said lifter means after delivering the casting onto said transport means.

9. The machine according to claim 1, wherein
   said two driven endless chains are adjustably mounted so that their distance apart from each other is adjustable for adaptation to different dimensions of the casting.

10. The machine according to claim 1, wherein
    said chains each comprises a plurality of chain links,
    said receiver means constitute straps formed with a key slot guide means for holding said casting therein and said straps are fastened to alternate of said chain links.

11. The machine according to claim 1, further comprising
    a lateral sheeting encloses said chains and forms said cooling channel.

12. The machine according to claim 11, wherein
    said endless chains and said receiver means are exclusive means between said sheeting,
    said receiver means are for holding said castings via said lugs in free suspension spaced apart from each other in the vertical position in said cooling channel such that uniform unshielded distribution of the cooling fluid to all areas of the castings occurs,
    said sheeting comprises two vertical lateral cover plates having a length extending along a lengthwise direction of said endless chains, respectively, adjacent to said chains and to said receiver means disposed between said lateral cover plates.

13. The machine according to claim 11, wherein
    said sheeting is made of metal.

14. The machine according to claim 1, wherein
    said means for moving comprises a stationary cam means for controlling axial movement of said pins on said sprocket wheels, respectively, said stationary cam means are operatively disposed at each said sprocket wheel, respectively,
    spring means for biasing said pins, respectively, into a retracted position.

15. The machine according to claim 1, further comprising
    a deposit plate is disposed between said sprocket wheels,
    said feed means comprises a pair of driver means displaceably arranged respectively on both sides of said deposit plate for gripping said lugs.

16. The machine according to claim 15, wherein
    said driver means are formed with a key slot guide for the gripping of said lugs,
    means for moving said driver means forward and backward.

17. The machine according to claim 16, wherein
    said means for moving said driver means is a piston/cylinder unit.

18. The machine according to claim 16, further comprising
    another pair of driver means arranged spaced from and in front of said first-mentioned pair of driver means for unloading said stamping means when said first-mentioned pair of driver means feeds said casting to said stamping means, respectively.

19. The machine according to claim 15, further comprising
    supporting rolls are arranged between said deposit plate and said stamping means.

20. The machine according to claim 1, further comprising
    control means for controlling opening of the casting mold and lifting and lowering movements of said lifter means as well as the speed of the movement of said two driven endless chains adapted to each other and variably.

21. The machine according to claim 20, further comprising
    a deposit plate is disposed at said end of the cooling path adapted to receive thereon said respective one of said castings from said deflection means in the horizontal position,
    said feed means and said stamping means have an operating cycle adapted to the control means,
    said deposit plate is formed with a recess,
    a proximity switch means is arranged in said recess of said deposit plate for controlling said feed means and a casting and stamping cycle of the machine.

* * * * *